March 1, 1927.  1,619,078

I. M. LADDON
SHOCK ABSORBING WHEEL
Filed May 11, 1923    2 Sheets-Sheet 1

INVENTOR
Isaac M. Laddon
BY Robert H. Young
ATTORNEY

March 1, 1927.
I. M. LADDON
1,619,078
SHOCK ABSORBING WHEEL
Filed May 11, 1923
2 Sheets-Sheet 2
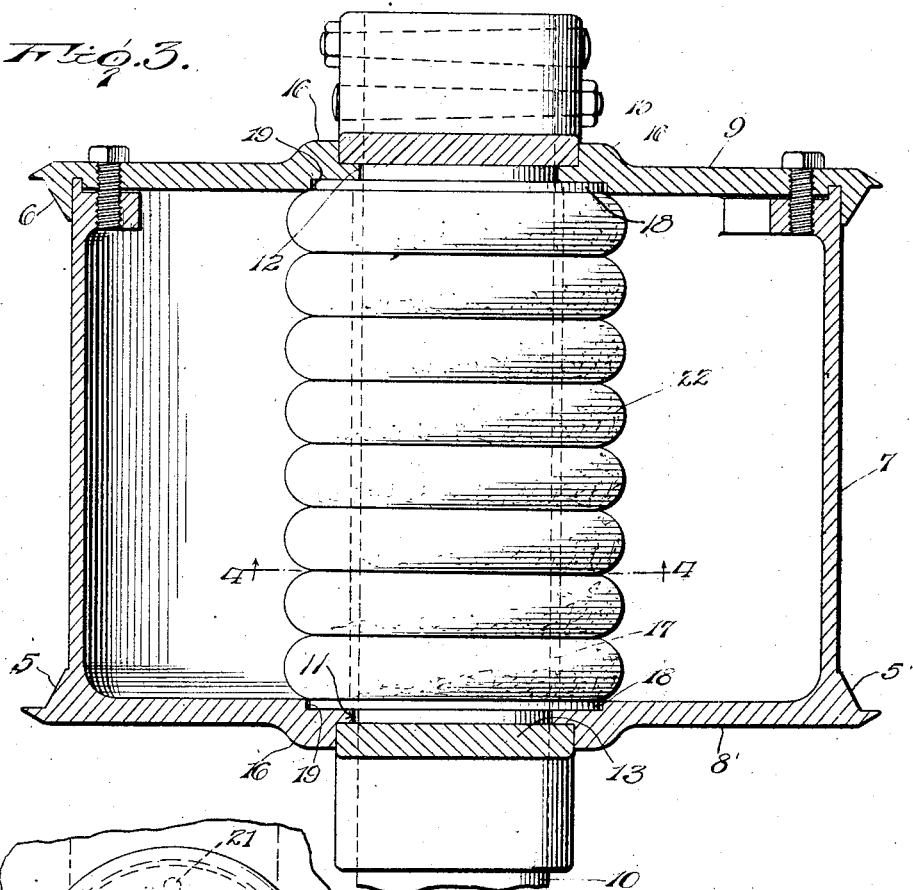
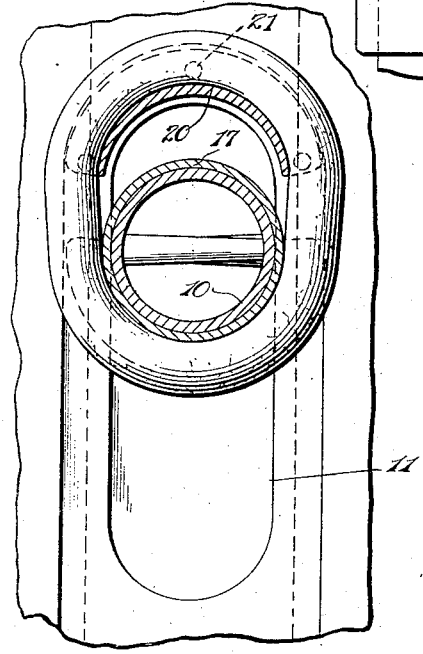
INVENTOR
Isaac M. Laddon
BY
Robert H. Young
ATTORNEY Patented Mar. 1, 1927.

1,619,078

UNITED STATES PATENT OFFICE.

ISAAC MACHLIN LADDON, OF DAYTON, OHIO.

SHOCK-ABSORBING WHEEL.

Application filed May 11, 1923. Serial No. 638,249.

This invention relates to shock absorbing wheels in general and more particularly to shock absorbing wheels so devised as to be especially adapted to the structure of aircraft. The wheels of aircraft landing gears are often necessarily subjected to a great amount of strain in all directions. The usual type of shock absorbing gear wheel is adapted to compensate for vertical thrust by permitting the axle of the wheel to move vertically against the force of shock absorbing cords.

It is therefore the object of the present invention to provide a shock absorbing wheel which may be mounted upon a fixed shaft or axle and provided with a central portion or hub member which will be non-rotary and which is yieldingly mounted on this fixed axle to move vertically, the outer portion of the wheel carrying a tire rim and tire in the ordinary manner.

With the foregoing and other objects in view which shall be more fully set forth as the description proceeds, this invention resides in the combination of parts, and in the details of construction hereinafter described and claimed, and it being understood that changes in the precise embodiment of the invention disclosed may be made within the scope of the claim without departing from the spirit of the invention, the specific embodiment of which is illustrated in the attached drawings.

Fig. 3 is a section on the line 3—3 of Fig. 1.

Fig. 4 is a section on the line 4—4 of Fig. 3 showing the load applied to the wheel and the shock absorber cords stretched.

Figure 1:
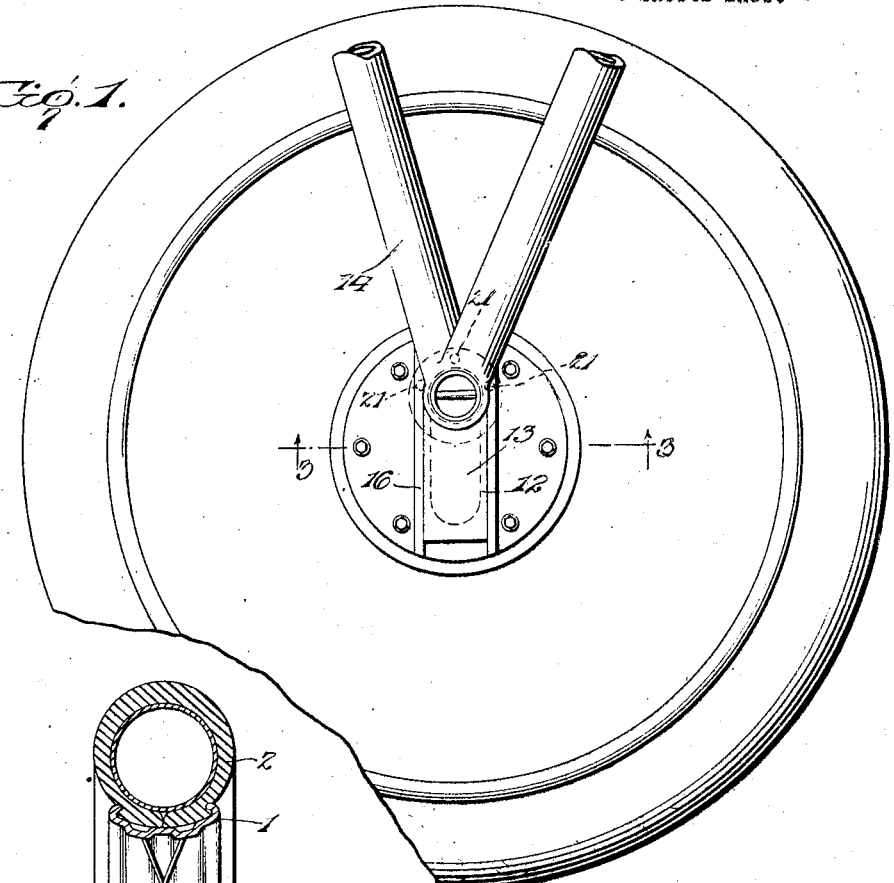
Fig. 1 is a side elevation of the wheel.

A tire rim 1 upon which a tire 2 is mounted, is supported by the customary spokes 3 from a rotary bearing member 4 which is rotatably mounted upon bearing members 5 and 6. A non-rotary cylindrical member 7 of which bearing member 5 forms a part, is provided with an end wall 8 made integral with the same and a cover plate 9 which is bolted to the cylindrical member 7. The bearing member 6 is formed as a part of this cover plate 9.

The non-rotary member 7 is supported in the following manner: A cylindrical shaft 10 which is non-rotary and which may be connected to brace the landing wheel to the airplane passes through slots 11 and 12 in the side wall 8 and cover plate 9, respectively, and is rigidly attached to brackets 13, one on either side of the hub member. These brackets are provided with integral upward extensions or fittings 14 and 15 to which the struts of the airplane may be attached. These brackets are permitted to move vertically with the axle 10 in relation to the central hub member by means of integral projections 16 on the end wall 8 and cover plate 9. These projections guide the brackets in their vertical movements.

Figure 2:
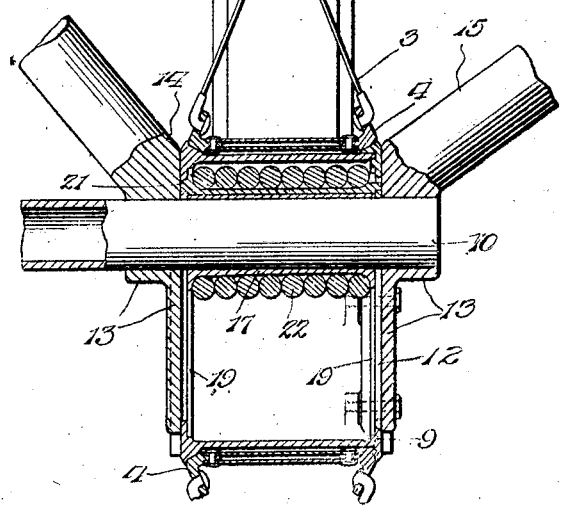
Fig. 2 is a vertical section through the same, parts being broken away.

Within the member 7 is a sleeve 17 surrounding the shaft 10 and loosely fitting thereon. This sleeve 17 is provided with flanges 18 which are guided in the vertical grooves 19 in the end wall and cover plate. A semi-cylindrical saddle 20 normally fits over the upper part of sleeve 17 and is fastened as shown in Fig. 2 to the end wall 8 by means of three pins 21 made integral with the flanges on the saddle which fit in three corresponding holes in the end wall. Similar pins and holes are provided for attaching the opposite end of the saddle to the cover plate 9.

An elastic shock absorbing cord 22 is wound around the saddle and sleeve and is normally under a considerable tension and this shock absorbing cord serves to hold the saddle and the hub attached thereto down against the sleeve on the axle but permits the saddle to be lifted away from the sleeve as shown in Fig. 4 when an extra load is applied to the wheels as, for example, when the airplane is landing. This shock absorbing cord may consist of a number of circular rings or may be a single cord helically wound around the saddle and sleeve. It will be noted that as the shock absorbing cord is under tension when the sleeve and saddle rest against each other as shown in Fig. 2, that the wheel will rotate about the hub with the latter in its normal position as shown in Fig. 2 with the normal load applied to the wheel but will provide a yielding shock absorbing quality to the wheel when an unusual load is applied.

The sleeve 17, saddle 20 and shock absorbing cord 22 are adapted to be removed as a unit after the cover plate has been taken off of the hub member by merely sliding these members off of the shaft. The cord is wound or applied to the sleeve and saddle under proper tension before these members are applied to the hub member and it is therefore unnecessary to wind the shock absorbing cord in position or to jack the different parts toward or away from each other in applying the cord as is the customary manner.

It will be noted that the natural axes of the supporting struts intersect each other at a point closely adjacent to the neutral axis of the shaft 10 and as all of these members are stress transmitting members serving to support the wheel, this relation is highly desirable, as it enables a minimum amount of material to be used in order to take care of the stresses encountered.

It will be perfectly obvious that annular tapered or roller bearings may be substituted for the plain tapered bearings shown and that this arrangement of a non-rotary axle and a nonrotary hub is of great importance particularly in monoplane design where it is advantageous to run the external bracing to the wing from the lowest point possible, as the axle 10, in order that stresses in this external bracing may be the minimum. The rubber cords are very well protected from oil, grease and weather, due to their being housed within the hub member, covere plate and end wall, and yet may be very accessible at any time.

I claim:

In combination in a resilient wheel, a cylindrical bearing member, spaced circular end plates fixed to opposite sides of said member, a supporting rod, a vertical slide in one of said end plates, a slide member guided in said slide, said rod being mounted in said slide member to move vertically therewith, a sleeve on said rod between said end plates, a semi-circular saddle device having a concave lower surface fitting said sleeve, means for rigidly attaching said saddle device to one of said end plates, and shock absorbing means wound circularly about said saddle device and said sleeve.

In testimony whereof I affix my signature.

ISAAC MACHLIN LADDON.